Patented Apr. 14, 1925.

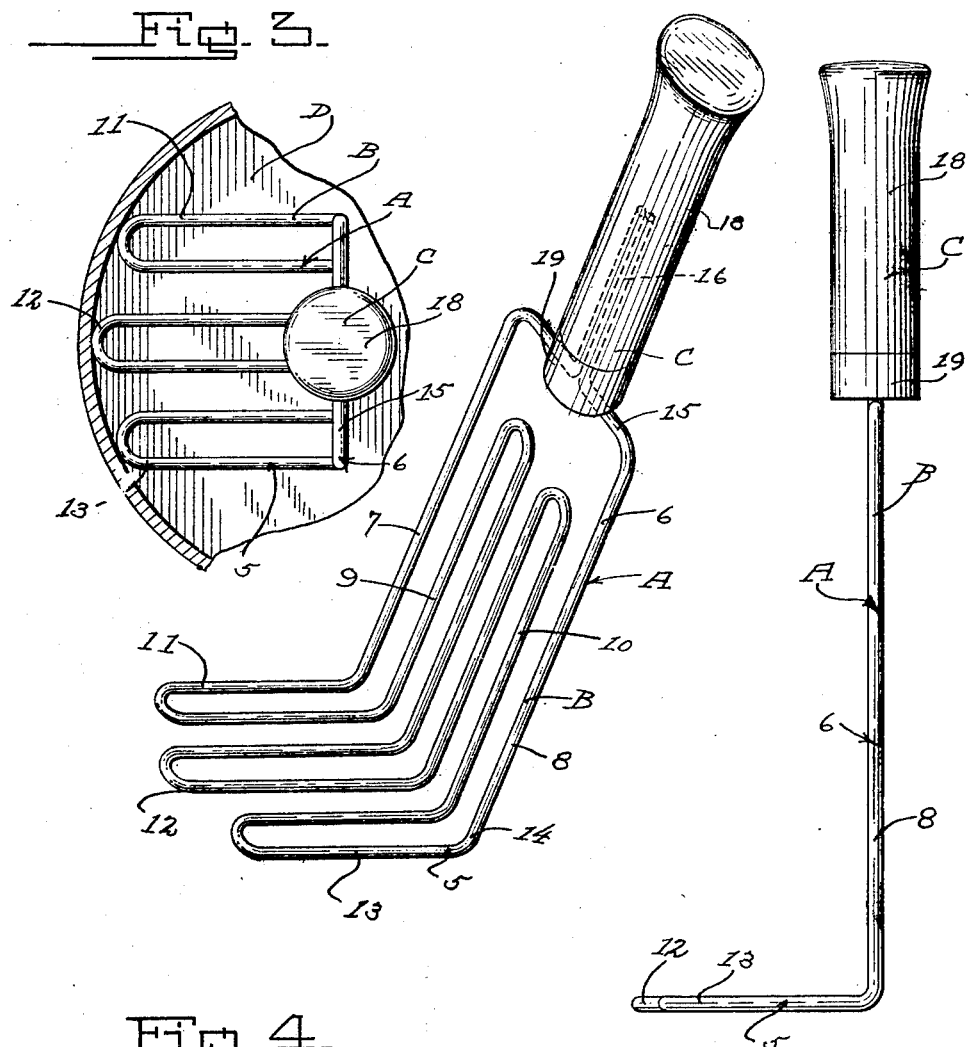
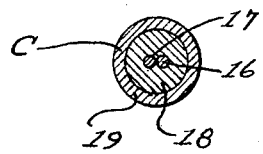

1,533,405

UNITED STATES PATENT OFFICE.

JOHN PATRICK GRIFFIN, OF WADDINGTON, NEW YORK.

KITCHEN UTENSIL.

Application filed March 13, 1922. Serial No. 543,317.

*To all whom it may concern:*

Be it known that I, JOHN P. GRIFFIN, a citizen of the United States, residing at Waddington, in the county of St. Lawrence and State of New York, have invented certain new and useful Improvements in Kitchen Utensils, of which the following is a specification.

This invention relates to kitchen utensils, and the primary object of the invention is the provision of a single device for effectively mashing and beating potatoes, and thereby eliminate the necessity of providing separate implements for mashing the potatoes and for beating the potatoes.

Another object of the invention is the provision of a combined potato masher and beater embodying a body including a horizontally disposed portion and a vertically disposed portion, the horizontally disposed portion being provided for permitting the effective mashing of the potatoes, and the vertically disposed portion being provided for beating the potatoes.

A further object of the invention is the provision of a combined potato masher and beater in which the masher tool embodies means for permitting the scraping of the potatoes from the bottom of the receptacle during the beating operation, so that all of the potatoes will be effectively whipped or beat into a light consistency.

A still further object of the invention is the provision of a combined potato masher and beater which is so shaped that the same can be effectively used in various ways, such as lifting of cooked meats, vegetables or the like, the body portion of the instrument acting as a strainer during the lifting operation.

A still further object of the invention is to provide an improved kitchen utensil of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a perspective view of the improved kitchen utensil.

Figure 2 is a side elevation of the same.

Figure 3 is a top plan view of the improved kitchen utensil showing the same in operative position in relation to a receptacle.

Figure 4 is a detail section through the handle portion of the improved utensil.

Referring to the drawing in detail, wherein similar reference characters designate corresponding parts throughout the several views, the letter A generally indicate the improved utensil which includes the body portion B and the handle C.

The body portion B includes the potato mashing portion 5 and the potato beating portion 6 and it can be seen that the potato mashing portion 5 and the potato beating portion 6 are disposed substantially at right angles to each other. The body portion B can be made of any desired material, such as sheet metal, or of wire bent into the desired configuration as shown in the drawings. If the body B is made of sheet metal, the same is fabricated in any suitable manner, in order to permit the passage of potatoes through the same.

Now, as stated the body B is preferably formed of wire and I have provided means whereby the said body portion can be formed of a single length of wire. In forming the same from a single length of wire, the wire is bent to provide side parallel bars 7 and 8, and intermediate inwardly extending U-shaped parallel loops 9 and 10. As clearly shown in Figure 2 of the drawings, the side bars 7 and 8 and the inwardly extending loops 9 and 10 are all disposed in the same plane. The provision of the inwardly extending U-shaped loops 9 and 10 define three U-shaped fingers 11, 12 and 13, and the body is bent intermediate its ends as at 14 to provide the right angularly extending portions 5 and 6. The intermediate U-shaped finger 12 is extended a slight distance beyond the fingers 11 and 13. This construction permits the potato mashing portion 5 to conform to the circular configuration of the side wall of a receptacle, as clearly shown in Figure 3 of the drawings.

The receptacle has been indicated by the reference character D and can of course, be of any preferred type of construction. The upper terminals of the side bars 7 and 8 are bent inwardly as at right angles as at 15 and then upwardly as at right angles to provide a shank 16 which is adapted to be inserted within the bore 17 of the handle C.

As shown, the handle C is made of wood and includes the solid cylindrical body 18. A suitable ferrule 19 can be utilized for engaging around the inner end of the body 18 for holding the shank portion 16 in position.

In use, the potatoes to be mashed are placed in the receptacle in the ordinary manner and the utensil A is grasped by the handle C and the lower horizontal portion 5 is brought forcibly into engagement with the potatoes until they become thoroughly mashed. The utensil is now moved in a circular path around the receptacle in which the potatoes are placed, and the beating portion 6 of the utensil will come into engagement with the potatoes and effectively beat the same. It is obvious that while the utensil A is being moved around in a circular path, that the mashing portion 5 will act as scrapers for engaging the bottom wall of the receptacle and effectively lift the potatoes from the bottom of the receptacle so that the same can be engaged by the beating portion 6. The heel portion of the utensil can also be used for engaging in the corners of a receptacle.

In practice, the device has been found very useful in lifting potatoes, meats and the like from out of pans, and for this use, the appliance is placed under the article to be lifted until the same rests between the right angularly disposed portions 5 and 6 of the body B. Of course, when the articles are being lifted, the utensil will act as a strainer, as is apparent.

From the foregoing description, it can be seen that an improved and simple kitchen utensil has been provided for effectively mashing and beating potatoes.

Changes in details may be made without departing from the spirit or scope of this invention; but,

I claim:

1. A combined mashing and beating utensil comprising a beating portion, a mashing portion transversely carried by the beating portion extending only to one side of the beating portion, and a handle carried by said beating portion.

2. A potato masher and beater comprising a body formed of a single length of wire including parallel side bars and inwardly extending intermediate U-shaped portions, the body being bent intermediate its ends to provide substantially disposed right angular potato masher and beating portions and a handle carried by the beating portions.

3. A potato masher and beater comprising a body formed of a single length of wire including parallel side bars and intermediate parallel U-shaped members, the body portion including substantially right angularly disposed potato beating and potato mashing portions, the parallel side bars lying in alignment with and in the same plane as the beating portion and having a shank formed thereon, and a handle arranged to receive said shank.

4. A combined potato masher and beater comprising a horizontally disposed portion including a plurality of resilient U-shaped fingers, a vertically disposed portion connected to said fingers at one end, and a handle carried by the vertically disposed portion.

5. A utensil comprising masher and beater portions arranged at an angle of less than 180° with respect to each other, said masher portion extending only to one side of the beater portion, and handle means for the utensil.

6. A combined mashing and beating utensil comprising masher and beater portions arranged at less than 180° with respect to each other, with the masher portion extending only to one side of the beater portion, and handle means for the utensil at the same side of the masher portion as the beater portion.

7. A utensil of the class described comprising a wire bent into a plurality of lengths, all of said lengths being bent transversely intermediate their ends to provide beater and masher portions disposed at substantially 90° with respect to each other, the edge of the masher portion opposite the juncture of the beater and masher portions being free of all lateral extension, and a handle extending outwardly of the beater portion.

JOHN PATRICK GRIFFIN.